United States Patent [19]
Jeffrey et al.

[11] 3,992,062
[45] Nov. 16, 1976

[54] COMBINATION FLUID PRESSURE AND ELECTRIC TRIP COCK EMERGENCY BRAKE APPARATUS FOR RAILWAY VEHICLES

[75] Inventors: William B. Jeffrey, North Huntingdon Township, Westmoreland County, Pa.; Richard K. Frill, deceased, late of Borough of Baldwin, Allegheny County, Pa., Patricia R. Frill, executrix, Whitehall, Pa.

[73] Assignee: Westinghouse Air Brake Company, Wilmerding, Pa.

[22] Filed: July 10, 1975

[21] Appl. No.: 594,722

[52] U.S. Cl. ................................. 303/3; 192/3 R; 303/81
[51] Int. Cl.² ..................................... B60T 13/66
[58] Field of Search ............... 303/2, 3, 15, 16, 20, 303/81, 86; 180/82 R, 77 R, 77 H; 192/4 R, 4 A, 2, 3 R–3 RX, 1

[56] References Cited
UNITED STATES PATENTS

| | | |
|---|---|---|
| 3,560,054 | 2/1971 | Sarbach ............................ 303/3 X |
| 3,638,770 | 2/1972 | Frill et al. ......................... 303/15 X |
| 3,730,596 | 5/1973 | Felix et al. ............................. 303/3 |
| 3,734,571 | 5/1973 | Coccia ............................... 303/3 X |
| 3,887,239 | 6/1975 | Engle ................................. 303/3 X |

Primary Examiner—Trygve M. Blix
Assistant Examiner—Jesus D. Sotelo
Attorney, Agent, or Firm—R. S. Visk; R. W. McIntire, Jr.

[57] ABSTRACT

Combination fluid pressure and electric operable trip cock emergency brake apparatus for use with railway vehicles including a trip cock device having a fluid pressure portion and an electrical portion, both operable concurrently, when a trip lever thereon is actuated by a trip arm located on the roadway, for providing concurrent fluid pressure and electrical pilot signals to cause operation of a common control switch which in turn, when so operated, actuates propulsion and brake control devices to cause propulsion power to be cut off and an emergency brake application to be effected concurrently. The fluid pressure and electric portions of the trip cock device complement each other to insure that one or the other, if not both, will effect the desired results in an emergency situation.

6 Claims, 4 Drawing Figures

COMBINATION FLUID PRESSURE AND ELECTRIC TRIP COCK EMERGENCY BRAKE APPARATUS FOR RAILWAY VEHICLES

BACKGROUND OF THE INVENTION

There are presently in use on rapid transit type railway vehicles both fluid pressure and electrical types of trip cock devices, one type being used independently of the other. When the fluid pressure type trip cock is tripped by a trip arm located strategically at some point along the track, valve means in the trip cock is opened to cause reduction of brake pipe pressure at an emergency rate for effecting an emergency brake application on the train and at the same time cause release of fluid pressure acting on a pressure operable electric switch which is thus operated for effecting energization of control means for causing propulsion power to be cut off. When the electrical type trip cock is employed, tripping of the trip cock causes an electrical switch therein to be operated to a position in which a control switch is actuated for energizing a train wire circuit. When the train wire circuit is energized, propulsion power is cut off concurrently with operation of brake control device on all the cars for effecting an emergency brake application thereon. In either case, whether it be the fluid pressure type or the electrical type trip cock, if the trip cock on the lead car, for example, fails to function properly, the amount of additional travel of the train, due to such malfunctioning of the trip cock, before it is brought to a stop may be critical. By the time the trip cock on the following car has been actuated, the lead car may already have traveled into the path of travel of another train approaching on an intersecting track.

Trip cock devices are also employed as back up means to assure stopping of a train such as, for example, when the train is entering a track section on which a disabled train is present, or when the train enters a depot, in which case the train will automatically be brought to a stop in the event the operator fails to do so.

SUMMARY OF THE INVENTION

The object of the present invention is to provide a trip cock device which is virtually assured of functioning to bring the train to an emergency stop when the trip cock is actuated.

Briefly, the invention comprises a trip cock device combining both the fluid pressure operable type and the electrical type in a single device having a single trip lever, which, when tripped causes both the fluid pressure portion and the electrical portion to be actuated concurrently for effecting cut-off of propulsion power at the same time that a brake application is effected. Actuation of the two portions of the trip cock devices not only causes reduction of brake pipe pressure via the fluid pressure portion (which in well known manner causes a brake application on the train), but also causes an electrical switch, operable both by fluid pressure and electrical solenoid, to be actuated so as to energize train circuits whereby certain control means on the train cause concurrent cut off of propulsion power and electrical actuation of the brake release devices on each car.

DESCRIPTION AND OPERATION

Figure 2:
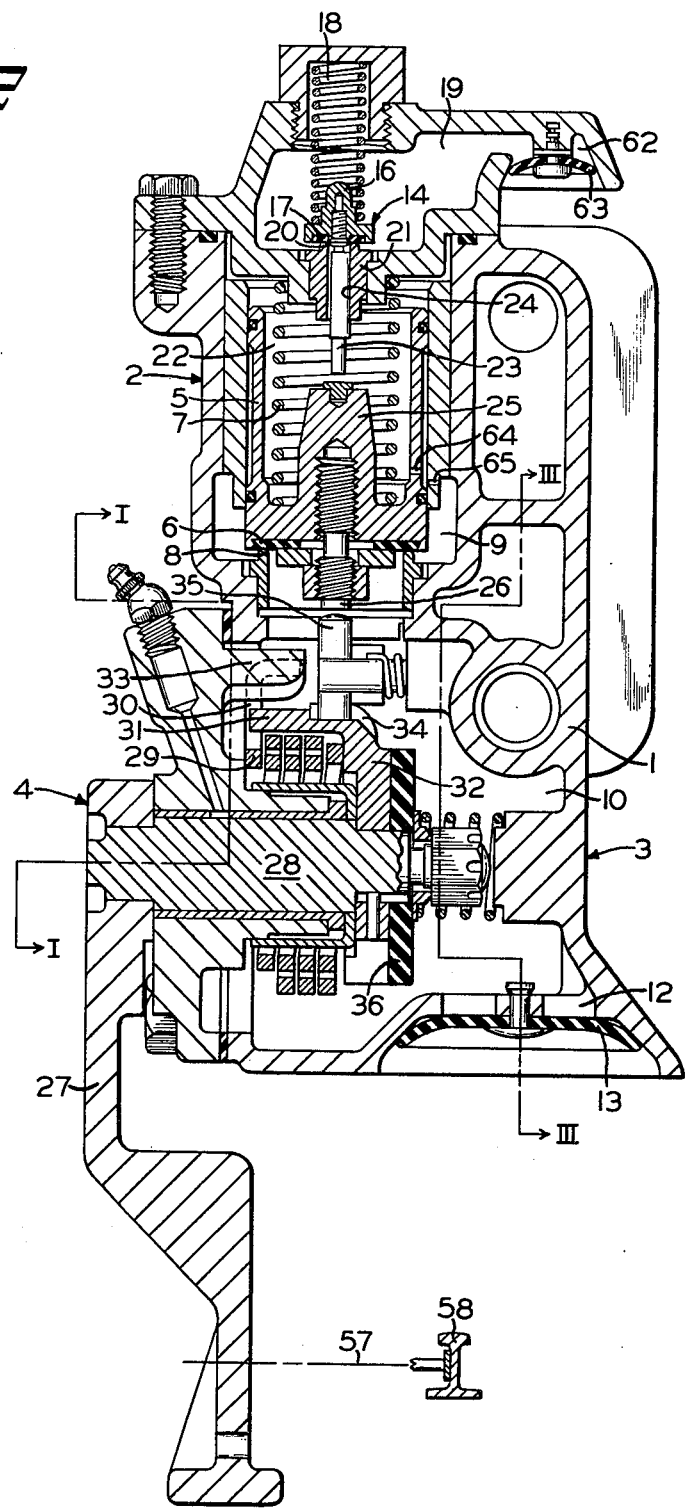
FIG. 2 is an elevational view, in section, taken along line II—II of FIG. 1 as viewed from the direction indicated by the arrows.

As best seen in FIG. 2, a trip cock device embodying the invention comprises a casing 1 for housing a fluid pressure operable portion generally designated at 2 and an electrically operable portion generally designated at 3, both of which are operable by a common trip lever assemblage 4.

The fluid pressure operable portion 2 comprises a piston 5, carrying at the lower end thereof, as viewed in FIG. 2, a valve member 6, and a spring 7 acting on said piston for urging said valve member into a sealed position on a valve seat 8 fixedly disposed in casing 1. With valve member 6 in its seated position on valve seat 8, communication is cut off between a pressure chamber 9 and an atmosphere chamber 10. Pressure chamber 9 is connected to a brake pipe 11 (see FIG. 1) extending the length of the train operable on a railroad right-of-way normally charged with fluid at a predetermined pressure, and atmoshperic chamber 10 is communicated to atmosphere via a vent 12, which is provided with a flexible protective element 13 for excluding dirt and other foreign matter from the device.

The fluid pressure operable portion 2 further comprises a pilot valve assemblage 14 disposed in axial alignment with piston 5 in the upper end of casing 1, as viewed in FIG. 2, said pilot valve assemblage comprising a valve-carrying member 16 on the lower end of which a valve element 17 is mounted. A spring 18 disposed in an atmospheric chamber 19 urges valve-carrying member 16 toward a seated position in which valve element 17 is seated on a valve seat 20 formed on bushing 21 coaxially and fixedly disposed in a separating wall formed in casing 1 between chamber 19 and a spring chamber 22 in which spring 7 is compressedly disposed. With valve 17 in its seated position, communication is cut off between chamber 19 and spring chamber 21.

For a purpose to be hereinafter disclosed, valve-carrying member 16 has a valve stem 23 secured to the lower side thereof and extending coaxially therefrom, through a coaxial bore 24 in bushing 21, into spring chamber 22. Stem 23 is of such length as to have its lower or free end axially spaced apart a predetermined distance, when valves 17 and 6 are in their respective seated positions, from the upper extremity of a portion 25 extending coaxially from the upper side of piston 5. Piston 5 also has a piston stem 26 of predetermined length extending coaxially from the lower side thereof into atmospheric chamber 10 for a purpose to be hereinafter disclosed.

Figure 1:
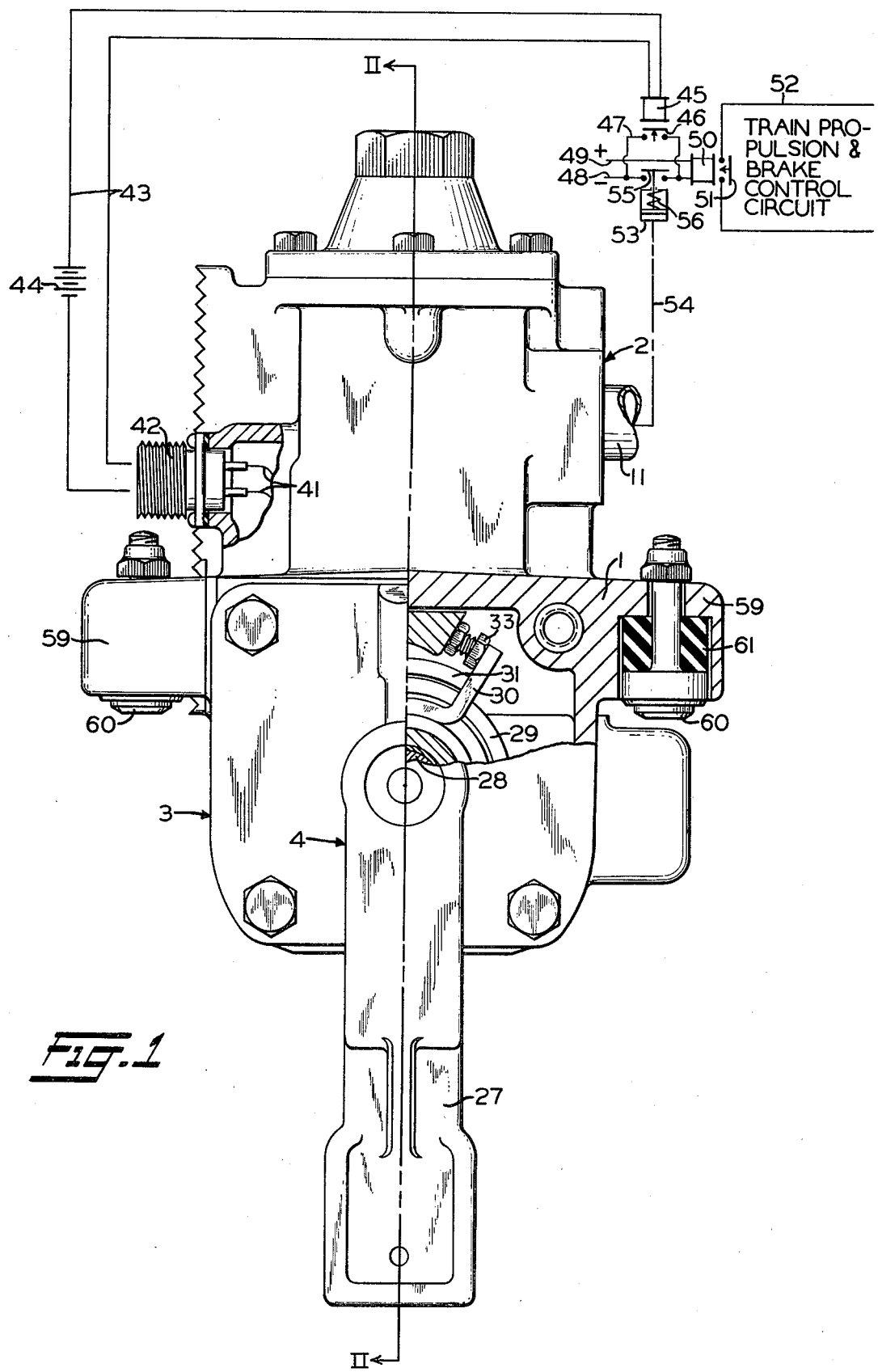
FIG. 1 is a schematic view of an emergency brake apparatus including a combination fluid pressure and electrically operable trip cock device with a certain fragmentary portion thereof shown in section taken along line I—I of FIG. 2, as viewed from the direction indicated by the arrows.

The trip lever assemblage 4 comprises a trip lever 27 having one end secured to an external end of and rotatable with a shaft 28 rotatably mounted in casing 1 in perpendicular relation to the axis of the trip cock device. Trip lever 27 is normally biased to a central or neutral position, in which it is suspended from shaft 28 in a perpendicular relation to the track bed, by a double wound torsion spring 29 encircling the inner end of said shaft. As best seen in FIG. 1, two opposite ends 30 (only one of which is shown) of spring 29 are formed so as to extend radially outwardly therefrom and are held in an angularly spaced relation by an arcuately shaped spacer 31 formed on a cam member 32 which is keyed on the inner end of shaft 28 for rotation therewith, said spring ends being so spaced apart as to be maintained under sufficient torsional stress for biasing the shaft and trip lever 27, from either angular direction, to the neutral position above defined.

Each end 30 of spring 29 rests against respective adjustable stops 33 (only one of which may be clearly seen in FIG. 1) fixed internally on casing 1, so that upon rotation of lever 27 and shaft 28 in a counter-clockwise direction to a first operating position, for example and as viewed in FIG. 1, the respective stop 33 restrains end 30 of spring 29 from following, while spacer 31 acting against the other end 30 carries the latter mentioned end with it in a counterclockwise direction and away from the other stop (not shown). If lever 27 and shaft 28 are rotated in a clockwise direction to a second operating position, the appropriate stop 33 and the spacer 31 cooperate in a manner similar to that described above, so that in either case spring 29 is retained under torsional stress for returning lever 27 and shaft 28 to the neutral position.

Also formed on cam member 32 is a cam lobe 34 which acts through a cam dog 35 for actuating piston valve 5 and pilot valve 14 in a manner to be hereinafter described.

Figure 3:
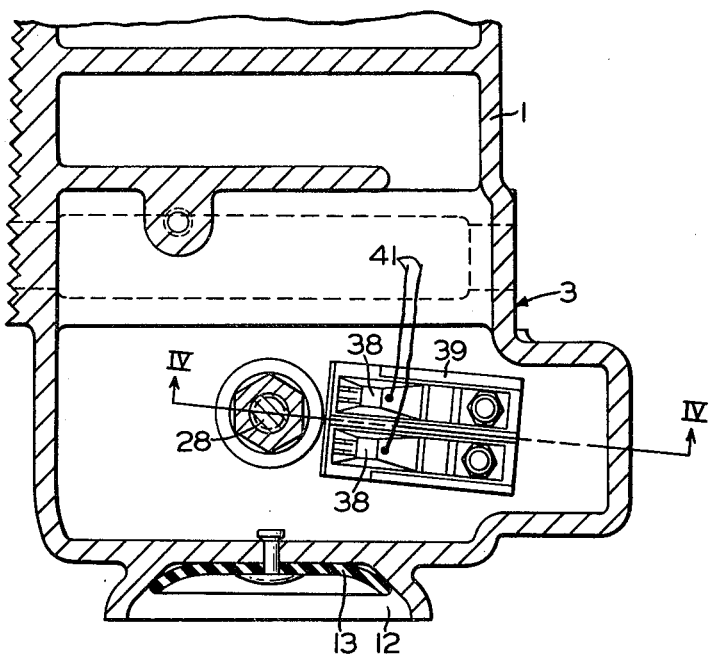
FIG. 3 is a fragmentary sectional view taken along line III—III of FIG. 2 as viewed from the direction indicated by the arrows.
Figure 4:
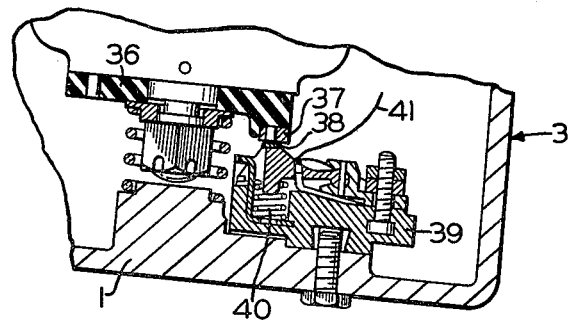
FIG. 4 is a fragmentary sectional view taken along line IV—IV of FIG. 3 as viewed from the direction indicated by the arrows.

The electrically operable portion 3, as best seen in FIGS. 3 and 4, comprises an annular member 36 made of nonconducting or insulating material and secured on shaft 28 for rotation therewith in abutting relation to cam member 32. Annular member 36 carries a shunt bar 37 which, in the neutral or central position of trip lever 27 and shaft 28, bridges a pair of spaced contact elements 38 disposed in a contact holder 39 secured to the casing 1. Contact holder 39 and contact elements 38 are so disposed as to have the contacts positioned in the plane of rotation of shunt bar 37, said contact elements being urged into contact with said shunt bar by respective springs 40.

Each of the contact elements 38, as partly shown in both FIGS. 3 and 4, is connected via respective electrical conductors 41, disposed internally of casing 1 and connected to an adapter 42 secured in the casing wall, as shown in FIG. 1. As also shown in FIG. 1, conductors 41 are connected via adapter 42 to a relay power circuit 43 in which a source of power 44 and a normally energized relay device 45 are serially interposed.

Since shunt bar 37 is normally in contact with both contact elements 38 (when trip lever 27 and shaft 28 are in the neutral position) and, therefore, circuit 43 is normally closed, relay 45 is consequently normally energized for retaining a contact member 46 in an open position in a parallel circuit 47 connected in parallel relation with a conductor 48, which with a conductor 49 comprises an energizing circuit in which a relay device 50 is connected. When relay 45 is deenergized, contact member 46 assumes a closed position relative to conductor 47 for closing the energizing circuit and effecting energization of relay 50. Energization of relay 50 effects closing of a normally open contact member 51 for closing a train propulsion and brake control circuit 52, the purpose of which will be hereinafter disclosed.

A pressure operable switch device 53, connected to brake pipe 11 via a pipe 54, is serially connected in conductor 48 and comprises a switch member 55 normally held in an open position when fluid pressure sufficient for overcoming a biasing spring 56 prevails in said switch device. When fluid pressure is reduced in brake pipe 11 and, therefore in switch device 53, spring 56 causes switch member 55 to assume a closed position in which the energizing circuit 48–49 is closed for energizing relay device 50 to close contact member 51.

Switch device 53 is positioned in conductor 48 such that the connecting ends of branch conductor 47 are connected to said conductor 48 on opposite sides of switch member 55. Thus, circuit 48–49 will be closed for energizing relay 50 whether only one of contact member 46 and swicth member 55 is closed, or both are closed.

A detailed description of circuit 52, which extends throughout the entire train, is not essential to an understanding of the invention, it being sufficient to know that when said circuit is closed by contact member 51, propulsion power is cut off and the respective brake control valves (not shown) on all the cars are simultaneously electrically actuated for effecting a brake application throughout the train.

In operation, when trip lever 27 is tripped by a trip rod 57 secured to a strategically located rail section 58, said trip lever and shaft 28 are rotated, either in a clockwise or counterclockwise direction depending upon which side of the vehicle the trip cock is mounted and the direction of travel relative to said trip rod. As may be seen in FIG. 1, respective bumpers 59, each comprising contact pads 60 and resilient shock-absorbing elements 61, only one of the latter being shown, are located on opposite sides of the trip cock device in the plane or rotation of trip lever 27 for limiting the amount of angular movement of said trip lever.

Rotation of shaft 28 and, therefore, cam member 32 causes cam dog 35 to engage and lift piston stem 26 so that valve 6 is unseated from valve seat 8, thereby causing venting of brake pipe pressure from pressure chamber 9 to atmosphere via vent 12. At the same time, portion 25 of piston 5 engages valve stem 23 of pilot valve 16 to effect unseating of valve 17 from valve seat 20 and consequent venting of brake pipe pressure from spring chamber 22 via atmospheric chamber 19 and a vent 62 opening therefrom, said vent also being provided with a flexible protective cover 63 for excluding dust and other foreign matter from the trip cock device.

Notwithstanding simultaneous reduction of brake pipe pressure on both the upper and lower sides of piston 5, brake pipe pressure acting on the lower side of the piston remains effective, after trip lever 27 is reset, for holding valve 6 unseated until the pressure on said lower side of said piston and, therefore, in brake pipe 11, has reduced sufficiently to effect, in conventional manner, a brake application and to allow spring 7 to reseat valve 6, at which time pilot valve also is reseated by spring 18. This type of action is accomplished because of the fact that the lower side of piston 5 is open directly to brake pipe 11, and therefore the reduction of pressure on said lower side, due to the larger volume of the brake pipe compared to the volume of chamber 22 adjacent the upper side, occurs at a relatively slower rate than the reduction of pressure in chamber 22.

After reseating of pilot valve 17 on valve seat 20, brake pipe pressure again builds up in spring chamber 22 via pressure chamber 9 and communicating ports 64 and 65 formed in the side wall of piston 5 and in an inner casing wall partially defining said pressure chamber, respectively.

At the same time that pressure is reduced in brake pipe 11, similar pressure reduction occurs in pipe 54 (see FIG. 1) and, therefore, in pressure switch device 53 to effect closing of switch member 55, energization of relay 50 and, therefore, closing of contact member 51. With closing of contact member 51 and, therefore, of circuit 52, propulsion power on the train is cut off and the brake valves on all the cars are electrically simultaneously actuated to effect reduction of brake pipe pressure locally on each car and thus effect a brake application throughout the entire length of the train in much lesser time than would be required if brake pipe pressure reduction for the entire length of the train had to occur via the first car only.

At the same time that trip lever 27 is rotated to cause actuation of the fluid pressure operable portion of the apparatus, as above described, shunt bar 37 (see FIGS. 3 and 4) is rotated out of contact with one or the other contacts 38, depending on the direction of rotation of lever 27 and shaft 28, to thereby open relay circuit 43 and deenergize relay 45. Whereupon, contact member 46 assumes its closed position relative to conductor 47, which is a further assurance that relay 50 is energized to close switch member 51 and thereby electrically effect cut-off of propulsion and actuation of the brake control valves (not shown) on each car for causing a brake application throughout the train, as described above in connection with reduction of fluid pressure in pipe 54.

As made evident by the description above set forth of the apparatus embodying the invention, said apparatus which includes fluid pressure and electrical operable portions actuable simultaneously by the trip cock device, insures that the brake application will be effected by one of the said portions if the other malfunctions.

Having now described the invention what we claim as new and desire to secure by Letters Patent is:

1. In railway vehicle brake apparatus including a brake pipe extending the length of a train operable on a railroad right-of-way and in which the brake pipe is normally charged with fluid at a predetermined pressure and is effective, upon a reduction of pressure therein, for causing a brake application on the train according to the degree of such brake pipe pressure reduction, the combination of:
   a. actuating means effective when energized for concurrently cutting off vehicle propulsion power and causing a reduction of brake pipe pressure;
   b. first energizing means connected to said actuating means and operable from a normally open position, in which said actuating means is deenergized, to a closed position for effecting energization of said actuating means;
   c. second energizing means connected to said actuating means in parallel relation with and operable independently of said first energizing means from a normally open position, in which said actuating means is deenergized, to a closed position for effecting energization of said actuating means; and wherein the improvement comprises:
   d. a trip cock device mounted on the vehicle and including:
      i. dual operating means comprising two operating portions each operable from a neutral position to an operating position for effecting operation of said first and second energizing means, respectively and independently of each other, to their respective closed positions; and
      ii. trip means operably engaging said two operating portions of the dual operating means and effective, when tripped out of a neutral position, for concurrently operating said two operating portions to their respective operating positions.

2. Railway vehicle brake apparatus, as set forth in claim 1, wherein said actuating means comprises:
   a. an electrical propulsion and brake control circuit extending throughout the train; and
   b. relay-operated switch means, including an electrical energizing circuit therefor, interposed in said propulsion and brake control circuit,
   c. said relay-operated switch means having a normally open position in which said control circuit is deenergized, and being operable to a closed position in which said control circuit is energized.

3. Railway vehicle brake apparatus, as set forth in claim 2 wherein:
   a. said first energizing means comprises a fluid pressure operable switch device operably interposed in said energizing circuit, said pressure operable switch device being connected to brake pipe pressure and operable responsively thereto above a certain degree to an open position for opening said energizing circuit, and operable responsively to a reduction of brake pipe pressure to a degree below said certain degree, as effected by one of said two operating portions, to a closed position for closing said energizing circuit; and
   b. said second energizing means comprises a relay-operated switch device operably interposed in said energizing circuit in parallel relation to said fluid pressure operable switch device, said relay-operated switch device being connected via a power circuit to the other of said two operating portions and being operable thereby to an open position, in which said energizing circuit is open, and to a closed position in which said energizing circuit is closed independently of operation of said fluid pressure operable switch device.

4. Railway vehicle brake apparatus, as set forth in claim 3, wherein:
   a. said trip means comprises a rotatable trip lever;
   b. said one operating portion of said dual operating means comprises valve means having a normally closed position, in which communication to atmosphere of the brake pipe and said fluid pressure operable switch device is cut off, and being operable by rotation of said trip lever out of its said neutral position to an open position in which fluid pressure is vented from said fluid pressure operable switch device to atmosphere; and
   c. said other operating portion of said dual operating means comprises rotary switch means having a normally closed position in which said power circuit is closed for operating said relay-operated switch device to its said open position, and being operable by said rotation of said trip lever to an open position in which said power circuit is opened and said relay-operated switch device is operated to its said closed position.

5. Railway vehicle brake apparatus, as set forth in claim 4, wherein said valve means, when in its said open position, also effects venting of the brake pipe to atmosphere and consequently a reduction of fluid pressure therein for effecting a brake application on the train.

6. Railway vehicle brake apparatus, as set forth in claim 1, wherein said brake pipe pressure reduction throughout the train occurs simultaneously at all the cars.

* * * * *